United States Patent Office 2,946,878
Patented July 26, 1960

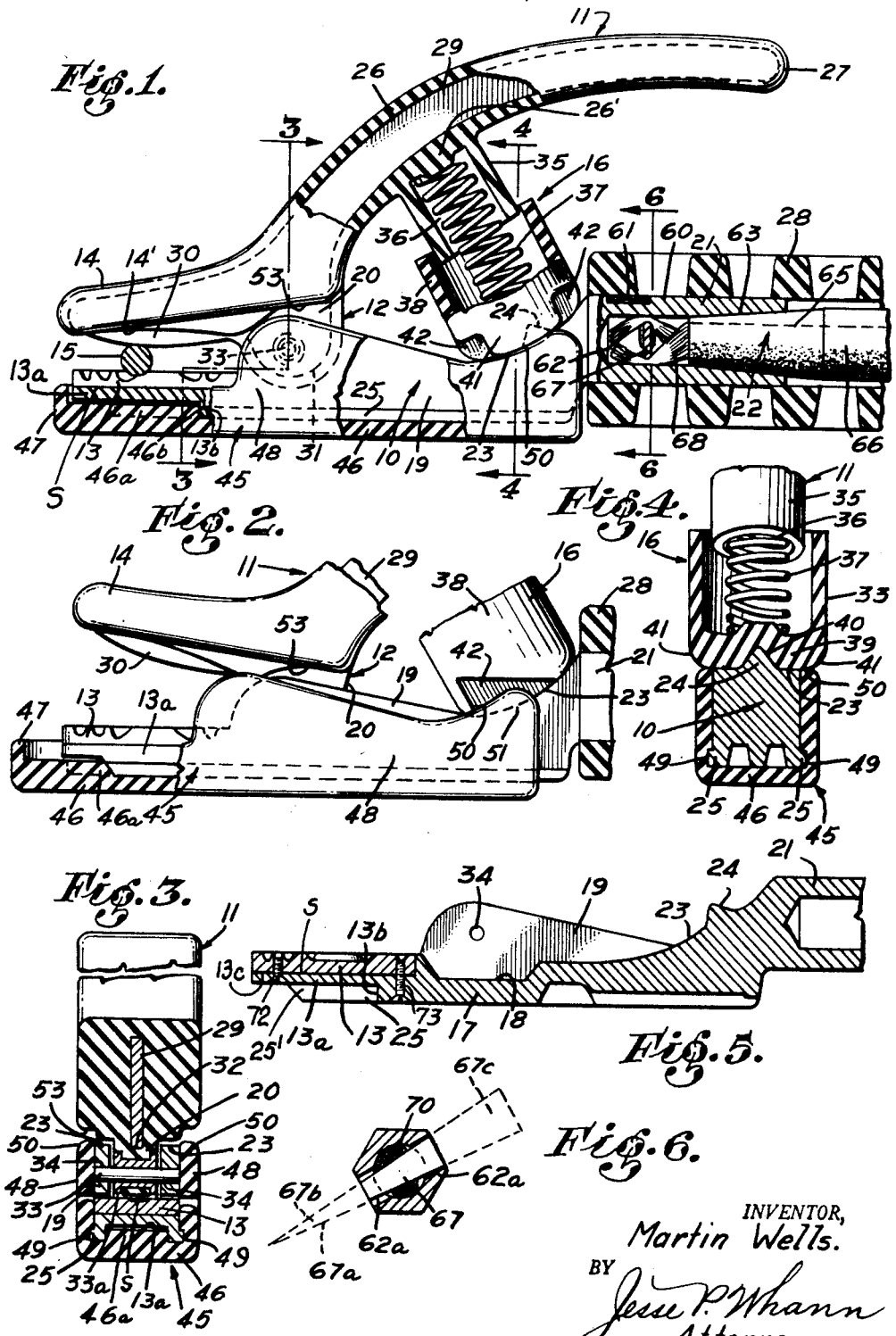

2,946,878

LIGHT WEIGHT HEAVY DUTY WELDING ROD HOLDER

Martin Wells, 5886 Compton Ave., Los Angeles, Calif.

Filed Feb. 11, 1958, Ser. No. 714,632

2 Claims. (Cl. 219—138)

My invention relates to welding rod gripping means commonly referred to as a welding rod holder for connecting to the end of an electric cable the welding rod employed in the electric welding process.

It is an object of the invention to provide a welding rod holder having relatively high current carrying capacity, yet being of comparatively light weight and capable of extended use over long periods of time without overheating. Copper has been extensively employed in the making of electrode holders and reasonably satisfactory results have been obtained, with only a few objections, the most important of which is the heavy weight which the hand of the welder must support over long periods of time because of the large mass of heavy metal employed in the electrode holder. In an attempt to overcome this difficulty the use of light weight metals, such as aluminum or an aluminum alloy, has been adopted by some manufacturers. The light weight welding rod holders herein referred to are made with lever or handle portions of cast aluminum with copper jaw members secured to the jaw portions of the light metal parts by use of screws or rivets. A serious objection to these light weight welding rod holders is overheating because of the poor electrical connections between the copper jaw members and the contacted parts which are made of an aluminum alloy.

Overheating of the jaw portions of these light weight welding rod holders, resulting from the electrical resistances present or developed in the connections between the jaw members and the jaw portions of the levers, results in limitation of the use of the electrode holders to relatively low current transmission because the higher current flows result in overheating of the electrode holder. It is recognized that where two metal parts are secured together in face to face contact, and even with the contacting faces thereof carefully finished, the actual area of contact between the surfaces is relatively small. Also, as the conductivity of the contacts between the copper jaw part and the holder part to which it is connected is reduced, there is an increase in the heat generated. Among the causes for this increase in resistance in the electrical connection may be the electrolytic action between the dissimilar metals and the building up of oxides of low electrical conductivity on the surfaces of these parts which are supposed to have good conductivity for the high amperage current utilized by the electrical welding process.

It is an object of my present invention to provide a welding rod holder having a lever portion made of a light weight metal such as aluminum or an aluminum-magnesium alloy, this lever member having at the front end thereof a jaw portion and at the rear end thereof a handle portion provided with means for making contact with an electrical cable, there being a jaw member of durable metal, such as copper or an alloy thereof and having high electrical conductivity, bonded to the jaw portion of the aluminum lever member over a large area, thereby providing a joint or connection between the light weight metal of the lever member and the copper jaw member having high initial electrical conductivity and which will not reduce in electrical conductivity over a period of time. In the practice of the invention I secure the jaw member to the aluminum lever member by use of a solder having a melting point higher than the temperature which exists in the jaw section of the welding rod holder during the operation of electrical welding. Herein I employ "aluminum" and "copper" as identifications of the relatively pure metals or alloys thereof. For example, the lever member may be made of an alloy having a large percentage of magnesium.

A further object of the invention is to provide a light weight welding rod holder having means for covering the metal parts of the holder so as to effectively insulate the same, and to provide an insulator part which is readily replaceable without need for tools to accomplish the replacement.

It is a further object of the invention to provide a welding rod holder having hinged levers wherein the lever which is connected to the electric cable is made of light weight electroconductive metal, and the other lever is made of light weight molded insulating material reinforced by a metal reinforcing strip which is isolated from the first lever so that it does not make electrical contact therewith. Accordingly, in the use of this electrode holder, there is no current flow in one of the levers, but the entire flow of welding current is through the remaining lever to the welding rod which is gripped between the jaw elements at the forward ends of the levers.

It is a further object of the invention to provide a welding rod holder of the character described herein in which the levers are held hingedly together by a transverse hinge pin, and having an effective insulator for the current-conducting lever, this insulator being provided with walls arranged to prevent removal of the hinge pin from its operative position by covering the ends of the hinge pin. An important feature is that this hinge pin, which is replaceable, carries no electric current, and therefore, does not become overheated.

It is a further object of the invention to provide an electrode holder having simple means for holding the removable insulator in position on the lever which it protects and for minimizing breakage of the insulator.

A further object of the invention is to provide in this electrode holder a part which not only serves to protect the spring means which spreads the levers, but also prevents removal of the removable insulator, the part being adjustable into a position wherein removal of the insulator is permitted.

Further objects of the invention are to provide a welding rod holder which is balanced so that it does not tend to rotate in the hand of the user, and which has an improved means for connecting an electric cable to the current-conducting part of the rod holder, to prevent the conductors from excess flexure and breakage adjacent the point of their connection with the rod holder.

Further objects and advantages of the invention may be brought out in the following part of the specification wherein details have been described for the purpose of providing a competent disclosure, without intending to limit the scope of the invention which is defined by the accompanying claims.

Referring to the accompanying drawings which are for illustrative purposes only:

Fig. 1 is a partly sectioned elevational view of a preferred form of the invention;

Fig. 2 is a fragmentary partly sectioned, elevational view of the leftward portion of Fig. 1, showing the adjustment of the parts so that the insulator may be removed from the current conducting lever;

Fig. 3 is a sectional view taken as indicated by the line 3—3 of Fig. 1;

Fig. 4 is a fragmentary sectional view taken as indicated by the line 4—4 of Fig. 1;

Fig. 5 is a longitudinal section through the metal current-conducting lever of the electrode holder; and Fig. 6 is a cross section of the cable connector, taken as indicated by the line 6—6 of Fig. 1.

As shown in Fig. 1, the welding for holder comprises first and second levers 10 and 11, connected by hinge means 12, and having jaw members 13 and 14 at the forward ends thereof between which a welding rod 15 is gripped when the jaws 13 and 14 are urged toward each other by the action of spreading means 16 arranged between the rearward portions of the levers 10 and 11 so as to spread apart these rearward portions and thereby move the jaw members 13 and 14 toward each other.

As shown in Figs. 3 and 5, the lever 10 comprises a metal 17 which is light weight and electroconductive such as aluminum, magnesium or an alloy thereof, and which extends from end to end of the lever 10. Between the ends thereof, but closer to the front end, the lever 10 has an upwardly faced depression 18 and upwardly projecting side walls 19 on opposite sides of the depression 18 and in parallel relation to each other so as to define a space to receive the hinge portion 20 of the lever 11. Also, the front end of the lever 10 comprises a jaw portion 13a to which the jaw member 13, of copper or copper alloy, is secured by a joint of solder S. At its rear end, the lever 10 has an integral tubular cable connector 21 arranged, as shown in Fig. 1, to receive the end of the electrical cable 22 of an electric welding device, not shown. On the rearward portion of the lever 10 adjacent the cable connector 21 there is a sloping surface 23 from which a conical projection 24 extends. As shown in Figs. 1, 4 and 5, starting at a location spaced from the front end of the jaw 13 longitudinally extending ribs or guides 25 are formed along the lower edges of the lever 10. Between the forward ends of the guides 25, there is in the bottom wall of the jaw portion 13a a channel 25' which is open at its front end and has at its rear end a stop or transverse shoulder 13b.

The lever 11 is molded from an insulating material 26 such as Bakelite, for example, and is curved upwardly and then rearwardly from the hinge portion 20 thereof so that its rear end 27 will be in spaced relation to the cable connector 21 and the handle 28 which is secured on the cable connector 21. Also, the portion 26' of the lever 11, lying between the hinge portion 20 and the rear end 27, is approximately parallel to the surface 23 of the lever 10. A feature of the lever 11 is that it has therein a reinforcing metal strip 29 of a shape corresponding to the shape of the lever 11, but being of reduced area so that it will be completely encased by the insulating material 26 except for the small portion 30 at the lower part of the leftward of forward end of the reinforcing strip 29 which projects downwardly from the lower face 14' of the jaw 14 so as to be positioned for engagement with the upper rounded surface of the welding rod 15. A portion 31 of the reinforcing strip 29 extends downwardly into the hinge portion 20 of the lever 11, as shown in Fig. 3, and has therein an opening 32 which is concentric with, but larger than, the diameter of the hinge pin 33 which projects through the hinge portion 20 of the lever 11 and has its ends received by pin openings 34 in the side walls 19 of the lever 10.

The lever 11 has an integrally molded wall 35 of insulating material projecting downwardly from the portion 26' thereof toward and substantially aligned with the projection 24. The wall 35 is tubular and defines a cavity 36 which receives the upper part of a coil spring 37. A cup 38, molded also from insulating material, receives the part of the spring 37 which projects from the tubular wall 35. The cup 38 has an internal diameter larger than the external diameter of the tubular wall 35 and receives the lower portion of the tubular wall 35, as shown in Fig. 1. The cup 38 has an approximately flat bottom wall 39 with a central socket or recess 40 to receive the projection 24, and the lower end of the cup 38 has diametrically opposed shoulders 41 projecting beyond the side faces of the lever 10. The lower end of the cup 38 has diametrally opposed notches 42 which are arranged between the shoulders 41, as shown in Figs. 1 and 2. The cup 38 is shown in Fig. 2 rotated 90 degrees from the position in which it is shown in Fig. 1.

A replaceable insulator 45, as shown in Fig. 1, covers the bottom, end and sides of the lever 10. This insulator 45 is molded from a durable insulating material and has a bottom wall 46, end wall 47 and side walls 48 which have at the lower edges of their inner faces channels 49 to receive the ribs 25 of the lever 10 as the insulator 45 is slid endwise onto the lever 10, passing through the position in which it is shown in Fig. 2 to the position in which it is shown in Fig. 1. The side walls 48 of the insulator 45 have the same general contour as the side faces of the lever 10 which they cover; therefore, the rearward portions of the side walls 48 have upper edges 50 of the same slope as the upper surface 23 of the lever 10, and as shown in Figs. 1 and 4, lie under the projecting shoulders 41 of the connector part or cup 38 of the spreader means 16, when the cup is positioned with its shoulders 41 extending laterally beyond the side faces of the lever 10. Being thus positioned with relation to the side wall upper edges 50, the shoulders 41 serve as stops or obstructions which prevent leftward movement of the insulator 45 from the position in which it is shown in Fig. 1. Raised from the bottom wall 46 of the insulator 45 is a heavy integrally formed rib 46a, extending from the front end wall 47 into the channel 13a and having at its rear end a transverse shoulder 46b which engages the shoulder 13b and transmits end thrust from the insulator 45 and holds the front end wall 47 in spaced relation to the front (leftward) end of the jaw 13 so that lateral force applied in rightward (rearward) direction against the insulator 45 will not result in the end wall 47 being driven against the end of the jaw 13 and thereby broken. Also, the front end of the insulator 45 is thereby made more massive, and therefore, more rugged.

Rotation of the cup 38 ninety degrees in clockwise direction from the position in which it is shown in Fig. 2 will bring the notches 42 into alignment with the edges 50 so that the rear upper ends 51 of the side walls 48 may pass through the notches 42, as shown in Fig. 2, enabling the insulator 45 to be slid outwardly (leftwardly) off from the lever 10. As shown in Figs. 1 and 3, the lever 11 has notches 53 providing clearances for the upper edges of the side walls 48 as the insulator 45 is moved on or off the lever 10. When a replacement insulator has been slid onto the lever 10, the cup 38 is rotated from the position in which it is shown in Fig. 2 to the position in which it is shown in Fig. 1, thereby disposing the shoulders 41 so that they will prevent removal of the insulator 45 from its position protection the lever 10.

A feature of the invention is that no electric current passes through the hinge pin 30, which, however, is supported by metal parts. The ends of the pin 33 are supported by the side walls 19 of the lever 11 and the intermediate portion of the pin 33 passes through a flanged metal tube 33' which is molded in the hinge portion 20 of the lever 11, and is insulated from the portion of the surrounding portion of the hinge portion 31 of the reinforcing strip 29. A further feature of the invention is the balance of the holder achieved by offsetting the handle 28 and the cable connecting part 21 upwardly with relation to the forwardly extending portion of the lever 10 so that its axis is approximately aligned with the hinge means 20 of the lever 11.

The cable connector 21 includes a tubular member 60 which is integral with the lever 10. Its exterior is polygonal, as shown in Fig. 6, and the handle 28 is frictionally held thereon by a bowed leaf spring 61 which occupies a recess in the face of the member 60. The rearward, or open end, of the opening 62 of the member 60 is defined by a flaring or conoidal wall 63, so that the outer end of the opening 62 flares in the manner shown. The wall 63 provides a tapered recess or socket at the outer end of the tubular member 60 to receive the tapered end 65 of the insulation 66 which covers the cable 22. The tubular member 60, near its forward end, has a transverse opening 62a which intersects the opening 62 of the member 60. A wedge 67 is adapted to be driven through the end 68 of the cable 22 which projects from the tapered end 65 of the insulation 66.

The making of the cable connection is as follows. The insulation 66 is first cut back from the end of the cable 22 and then by use of a grinding wheel, for example, the end 65 of the insulation 66 is tapered so as to conform to the taper of the wall 63. The cable is then inserted in the opening and the tapered end 65 of the insulation is brought tightly against the tapered wall 63. The wedge 67 is then driven through the opening 62a and through the end 68 of the cable 22. The wedge 65 is originally of a length and shape shown by dotted lines 67a of Fig. 6, and when it is driven through the cable 22 the sharpened front end 67b thereof separates the wire 70 of the cable end 68 and wedges them tightly against the metal wall of the tubular member 60. The ends 67b and 67c of the wedge 67 are then cut off flush with the outer face of the tubular member 60. The separating of the wires 70 by the wedge 67 also has the effect of pulling the cable 22 inwardly so that the tapered end 65 of the insulation 66 is held firmly against the tapered wall 63 of the socket provided by the opening 62 of the member 60. The cable and the insulation thereof are held so that they do not readily twist back and forth or flex and thereby fraying of the cable and breaking of the wires of the same is avoided. The lever 10 is of such form that it may be readily cast from a light weight, electroconductive metal, such as aluminum or magnesium, or an alloy thereof.

As shown best in Figs. 3 and 5, the jaw portion 13a of the lever 10 has an upwardly presented face 13c which confronts the lower face of the jaw member 13 and is bonded thereto by a layer of solder S or a eutectic bond or weld which provides an area of electrical transmission between the parts 13 and 13a capable of carrying the heavy welding current without overheating the jaw end of the lever 10. In a satisfactory practice of the invention, the layer or joint of solder S is a zinc-aluminum mixture containing a sufficiently large quantity of aluminum to give it a melting point of close to 700° F., which is considerably higher than any temperature generated in the solder joint S by the flow of the welding current therethrough. The solder, being bonded to the confronting surfaces of the parts 13 and 13a, protects them from oxidation and against reduction in the cross-sectional areas of the current flow paths from the lever 10 to the jaw member 13. The term "solder" is employed in its broader sense and, therefore, is inclusive of brazing should a solder be developed which contains brass.

The invention also includes auxiliary or supplementary means for holding the copper jaw element 13 on the lever 10 to prevent separation of the parts 10 and 13 should these parts be subjected to heat of such high temperature as to temporarily destroy the bond between them, such means being shown as small screws 72 and 73. The area of the mounted connection between the jaw elements 13 and the front end portion 13a of the lever 10 is of such large area that the flow of current from the part 13a to the part 13 will be of low concentration so that there will be very little generation of heat. However, it is conceivable that the parts 13 and 13a may be subjected to heat of such high temperature as to cause the solder S to melt. The screws 72 and 73 hold the jaw element 13 in its operative position on the portion 13a of the first lever 10 so that the jaw element 13 cannot become displaced from its operative position. When the temperature of the parts is again reduced the solder S therebetween will harden and the electrical connection between and the operative relationship of the parts 13 and 13a will be maintained. In the practice of the invention, the holes for the screws are drilled and tapped after the mounting of the jaw element 13 onto the part 13a has been accomplished. No current carrying capacity is required of these screws 72 and 73 for the bond between the jaw element 13 and the portion 13a is more than ample to carry the maximum current flow to the jaw element 13.

I claim:

1. In a welding rod holder: first and second levers hingedly connected intermediate the ends thereof, said levers having jaw elements at the front ends thereof to grip a welding rod, said first lever comprising aluminum and the jaw element of which comprises a body of copper soldered onto the first lever, and said second lever being of molded insulating material and having a reinforcing strip therein, said reinforcing strip being isolated from said first lever so that no electric current will flow in said reinforcing strip of said second lever; hinge means connecting the intermediate portions of said levers together; a cable connector at the rear end of said first lever; and means for swinging said levers so as to cause said jaw elements to swing toward each other and grip a welding rod.

2. In a welding rod holder: first and second levers hingedly connected intermediate the ends thereof, said levers having jaw elements at the front ends thereof to grip a welding rod, said first lever comprising aluminum and the jaw element of which includes a metal body comprising copper electrically connected to said first lever by a layer of solder and being the sole conductor of electrical current to said welding rod, and said second lever being a nonconductor so that no electric current flows therethrough; hinge means connecting the intermediate portions of said levers together, comprising a metal sleeve in said second lever and a hinge pin extending through said sleeve ad having the ends thereof supported by said first lever; a cable connector at the rear end of said first lever; and spreader means between the rear ends of said levers for swinging said levers so as to cause said jaw elements to swing toward each other and grip a welding rod.

References Cited in the file of this patent

UNITED STATES PATENTS

| | | |
|---|---|---|
| 2,003,196 | Jackson | May 28, 1935 |
| 2,174,809 | Varner | Oct. 3, 1939 |
| 2,196,565 | Pishioneri | Apr. 9, 1940 |
| 2,336,732 | Howard | Dec. 14, 1943 |
| 2,373,605 | Shellabarger | Apr. 10, 1945 |
| 2,393,742 | Brazitis | Jan. 29, 1946 |
| 2,404,028 | Best | July 16, 1946 |
| 2,404,437 | Donnelly | July 23, 1946 |
| 2,412,492 | Brazitis | Dec. 10, 1946 |
| 2,412,717 | Cotton | Dec. 17, 1946 |
| 2,422,812 | Wachter et al. | June 24, 1947 |
| 2,427,002 | Jepson | Sept. 9, 1947 |
| 2,472,177 | Taber | June 7, 1949 |
| 2,846,564 | Nagy | Aug. 5, 1958 |